United States Patent [19]

Nitta et al.

[11] Patent Number: 4,575,702
[45] Date of Patent: Mar. 11, 1986

[54] PERMANENT MAGNETIC CHUCK

[75] Inventors: Takeshi Nitta, Ebina; Hiroshi Iwasaki, Tokyo, both of Japan

[73] Assignee: Fuji Jiko Kabushiki Kaisha, Tokyo, Japan

[21] Appl. No.: 613,071

[22] Filed: May 22, 1984

[30] Foreign Application Priority Data

May 30, 1983 [JP] Japan .................................. 58-95548

[51] Int. Cl.⁴ .............................................. H01F 7/20
[52] U.S. Cl. .................................... 335/286; 335/288; 335/295
[58] Field of Search ............... 335/285, 286, 287, 288, 335/295

[56] References Cited

U.S. PATENT DOCUMENTS

| | | | |
|---|---|---|---|
| 3,039,026 | 6/1962 | Levesque | 335/286 |
| 3,078,565 | 2/1963 | Sanders | 335/286 X |
| 3,228,133 | 1/1966 | Baermann | 335/285 X |
| 4,075,589 | 2/1978 | Braillon | 335/286 |
| 4,122,922 | 10/1978 | Baermann | 335/288 X |
| 4,419,644 | 12/1983 | Baermann | 335/288 |
| 4,468,649 | 8/1984 | Matsuhashi | 335/295 |

Primary Examiner—George Harris
Attorney, Agent, or Firm—Oblon, Fisher, Spivak, McClelland & Maier

[57] ABSTRACT

A permanent magnetic chuck in which a workpiece holding plate comprises a plurality of permanent magnets each with a magnetic isolator which are alternatively laminated, said magnetic pole pieces and said magnetic isolator are respectively constructed as layers of a plurality of thin magnetic layers and a plurality of thin non-magnetic layers each of which is disposed alternately with each of said magnetic layers; and a sliding magnet member which comprises a plurality of disk-shaped permanent magnets disposed in round holes provided in said member at the same pitch as the lamination pitch of the workpiece holding plate is disposed. The permanent magnets of the workpiece holding plate are so disposed that the same magnetic poles of the adjacent magnets are opposed to each other. The permanent magnets of the sliding magnet member are so disposed that the magnetic lines of flux pass vertically and that the opposite magnetic poles of the adjacent permanent magnets are opposed to each other.

7 Claims, 14 Drawing Figures

PERMANENT MAGNETIC CHUCK

BACKGROUND OF THE INVENTION

The present invention relates to generally a magnetic chuck of the type in which when magnetic circuits are switched, a workpiece can be tightly held on the workpiece holding surface or can be released therefrom, and more particularly to a permanent magnetic chuck which can be turned on and off by upper (stationary) permanent magnets mounted on a workpiece holding plate and lower permanent magnets of a sliding member.

Referring first to FIG. 1, a prior art magnetic chuck will be described. FIG. 1 is a fragmentary longitudinal sectional view of a prior art magnetic chuck. FIG. 1(a) shows the OFF state (the de-energized state) while FIG. 1(b) shows the ON state (for tightly holding a workpiece on the workpiece holding surface). A base plate 1 made of a nonmagnetic material has a vertical wall 2 made of a nonmagnetic material. Magnetic pole pieces 3 made of a soft iron and permanent magnets 4 are alternately laminated and magnetic isolators 5 are interposed between the pole piece 3 and the permanent magnet 4. Thus, a workpiece holding plate is provided. Magnetic pole pieces 6 made of a soft iron and permanent magnets 7 are alternately disposed within a box defined by the base plate 1, the wall 2 and the workpiece in such a way that the same poles of the adjacent permanent magnets 7 are opposed to each other. The pole pieces 6 and the permanent magnets 7 constitute a sliding magnet member.

Next the mode of operation of the prior art magnetic chuck with the above-described construction will be described. When the sliding magnetic member is located at the position shown in FIG. 1(a), a magnetic circuit $F_1$ does not appear at the top surface of the workpiece holding plate. As a result, the magnetic chuck is in the OFF state so that a workpiece is released. When the magnetic member is located at the position as shown in FIG. 1(b), the magnetic circuit $F_2$ appears at the top surface of the workpiece holding plate. As a result the magnetic chuck is turned on so that a workpiece is tightly held in position.

In the prior art magnetic chuck as shown in FIG. 1, the magnetic chuck is turned on or off by sliding the lower magnets relative to the upper magnets (the workpiece holding plate) so that an excellent residual magnetism characteristic can be obtained. However, the directions of the magnetic poles of the sliding permanent magnets are in parallel with the workpiece holding plate (in the horizontal direction). As a result, the position of the workpiece holding plate (from the bottom surface of the base plate 1) must be raised. In addition, when the magnetic pole pieces 3 made of a magnetic material are moved away from the magnetic pole pieces 6 when the magnetic chuck is turned on or off, a heavy load is produced due to the magnetostriction phenomenon in which the magnetic paths between the pole pieces 3 and 6 become narrower according to the movement of the magnetic pole pieces 3 away from the magnetic pole pieces 6, increasing magnetic resistance in said magnetic paths. As a result, the prior art magnetic chuck has a disadvantage that a great force is required to turn on or off the magnetic chuck and consequently a sliding mechanism which can withstand such great force must be provided.

SUMMARY OF THE INVENTION

The primary object of the present invention is therefore to provide a permanent magnetic chuck which has a better residual magnetism characteristic; whose workpiece holding plate is thin; and in which a load required for turning on or off the magnetic chuck is small.

To the above and other ends, the present invention provides a permanent magnetic chuck in which first permanent magnets with a high coercive force are assembled in a workpiece holding plate in such a way that the same magnetic poles of the adjacent permanent magnets are opposed to each other; second permanent magnets with a high coercive force are incorporated in a sliding magnet member which is disposed below the workpiece holding plate; and the second permanent magnets are so disposed that the opposite poles of the permanent magnets appear alternately at the upper surface of the sliding magnet member which is made into contact with the bottom surface of the workpiece holding plate.

BRIEF DESCRIPTION OF THE DRAWINGS

Same reference numerals are used to designate similar parts throughout FIGS. 2-10.

DETAILED DESCRIPTION OF THE INVENTION

Figure 1A:
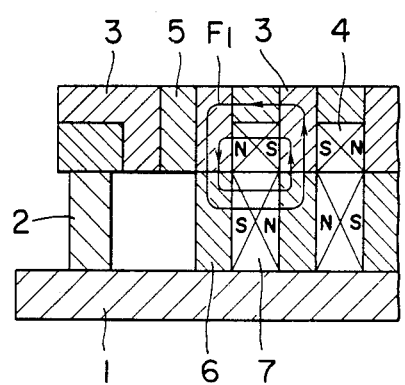
FIG. 1 is a fragmentary longitudinal sectional view showing a prior art magnetic chuck.
Figure 1B:
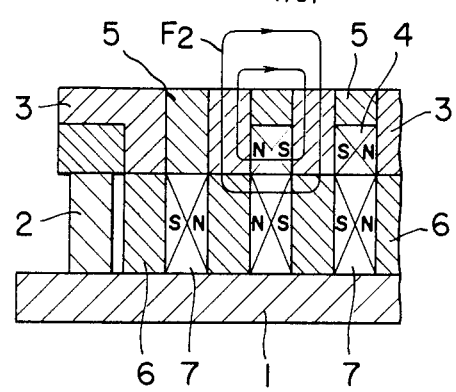
Figure 2:
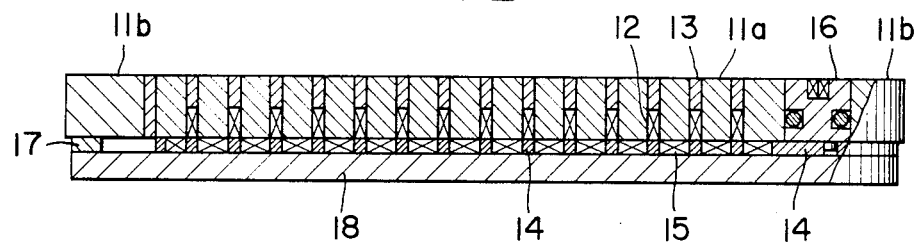
FIG. 2 is a longitudinal sectional view of a fundamental structure of the present invention.

With reference to FIGS. 2-10, the preferred embodiments of the present invention will be described. FIG. 2 shows in longitudinal section a first embodiment of the present invention. Magnetic pole pieces 11a made of a soft iron and permanent magnets 12 with a high coercive force are alternately arranged in an array and end magnetic pole pieces 11b are securely attached to the ends of the array. Isolators 13 are disposed upon the permanent magnets 12. Thus, a workpiece holding plate is defined. The permanent magnets 12 are disposed horizontally in such a way that the same poles of the adjacent permanent magnets are opposed to each other. The permanent magnets 12 are made of a ferrite magnetic material or a rare earth magnetic material. Since magnetic materials have a high coercive force and a small residual magnetism, they have features that they can be magnetized before they are assembled into magnetic chucks and that the magnetic pole length can be reduced (that is, each permanent magnet can be made thin). Furthermore their permeability $\mu$ is substantially equal to the permeability $\mu_0$ in vacuum so that the magneto-striction phenomenon can be avoided.

A sliding magnetic member consisting of a sliding frame 14 and permanent magnets with a high coercive force is slidably attached to the bottom surface of the workpiece holding plate. The permanent magnets 15 are disposed at the same pitch as the permanent magnets 12 and the magnetic pole pieces 11a, and the direction of magnetic flux is at right angles to the workpiece holding surface (in the vertical direction). The north and south poles of the permanet magnets 15 alternately appear at the bottom surface of the workpiece holding plate. The permanent magnets 15 are made of a ferrite or rare earth magnetic material. If the permanent magnets 12 and 15 are made of the same magnetic material, the area of the magnetic pole of the permanent magnet 12 is less than one half of the area of the magnetic pole of the permanent magnet 15, but the thickness of the permanent magnet 12 is more than two times thicker than the thickness of the permanent magnet 15. The reason why the area is not half and why the thickness is two times is that it is preferable that the magnetic chuck is slightly excited in the reverse direction because a workpiece has a residual magnetism. The sliding frame 14 is made of a nonmagnetic material and one end of the magnetic frame 14 is connected to a sliding mechanism (eccentric cam) 16 mounted on the workpiece holding plate so that the permanent magnets 15 may be slid by one pitch.

The sliding magnetic member is enclosed by a main body frame 17 and a bottom plate 18, whereby a permanent magnetic chuck is provided. The main body frame 17 is made of a nonmagnetic material while the bottom plate is made of a magnetic material such as a soft iron.

Figure 3:
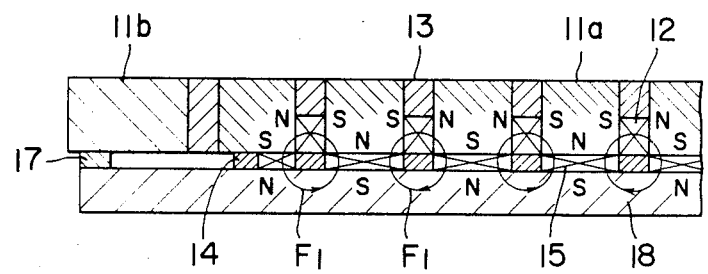
FIGS. 3 and 4 are fragmentary sectional views, on enlarged scale, thereof.
Figure 4:
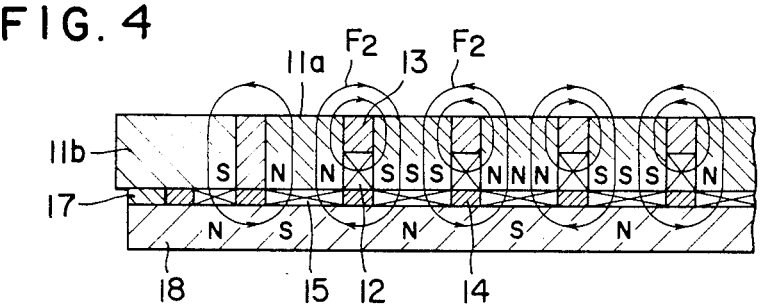

Referring next to FIGS. 3 and 4 the mode of operation of the magnetic chuck with the above-described construction will be described. FIGS. 3 and 4 is a fragmentary view, on enlarged scale, of FIG. 2 and FIG. 3 shows an OFF state (de-energized state) while FIG. 4 shows an ON state (for holding a workpiece).

When the magnetic pole pieces 11a of the permanent magnets 15 are different in polarity from the magnetic pole pieces 11a of the permanent magnets 12 as shown in FIG. 3, a magnetic circuit $F_1$ is short-circuited through the magnetic pole pieces 11a and the bottom plate 18. As a result, no magnetic circuit appears at the upper surface of the workpiece holding plate. Therefore the permanent magnet chuck is in the OFF state.

However, when the magnetic pole pieces 11a of the permanent magnets 15 are same in polarity with the pole pieces 11a of the permanent magnets 12 as shown in FIG. 4, the magnetic lines of flux pass from one magnetic pole piece 11a to the adjacent magnetic pole piece 11a. As a result, as indicated by $F_2$, the magnetic circuit appears at the upper surface of the workpiece holding plate. Therefore the permanent magnet chuck is in the ON state.

Figure 5:
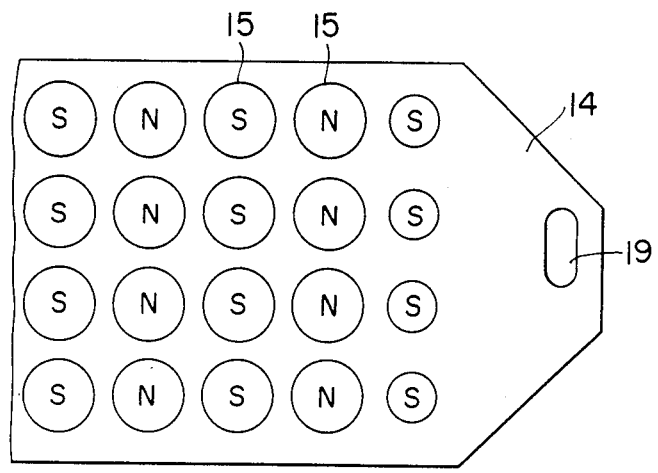
FIG. 5 is a top view of sliding magnet members, respectively, in accordance with the present invention.

FIG. 5 is a fragmentary top view of the sliding magnet member as shown in FIG. 2. Same reference numerals are used to designate similar parts in FIGS. 2 and 5. The sliding frame 14 is formed with a plurality of round holes having the same pitch with the permanent magnets 12. The permanent magnets 15 are fitted into these round holes in such a way that the north and south poles appear alternately. The sliding mechanism or eccentric cam 16 is fitted into a pin hole 19 so that the permanent magnets 15 are shifted by one pitch. The holes into which are fitted the permanent magnets 15 are round so that the machining for drilling the holes is much facilitated.

Figure 6:
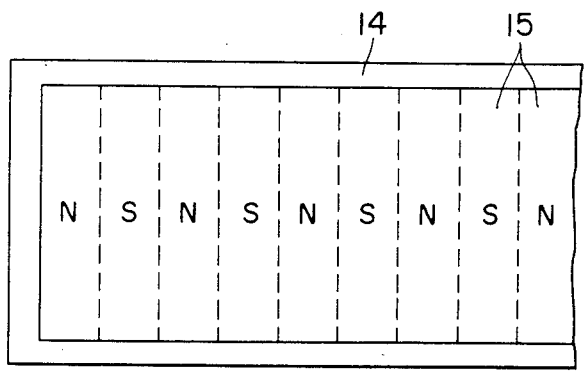
FIG. 6 is a top view of a further sliding magnet member in accordance with the present invention.

FIG. 6 shows another embodiment of the permanent magnet arrangement of the sliding magnet member. The permanent magnets 15 comprise plastic magnets made of a rare earth magnetic material or a ferrite magnetic material. One rectangular magnet is divided into sections and then magnetized so that the fabrication and arrangement of permanent magnets are rather easy.

Figure 7:
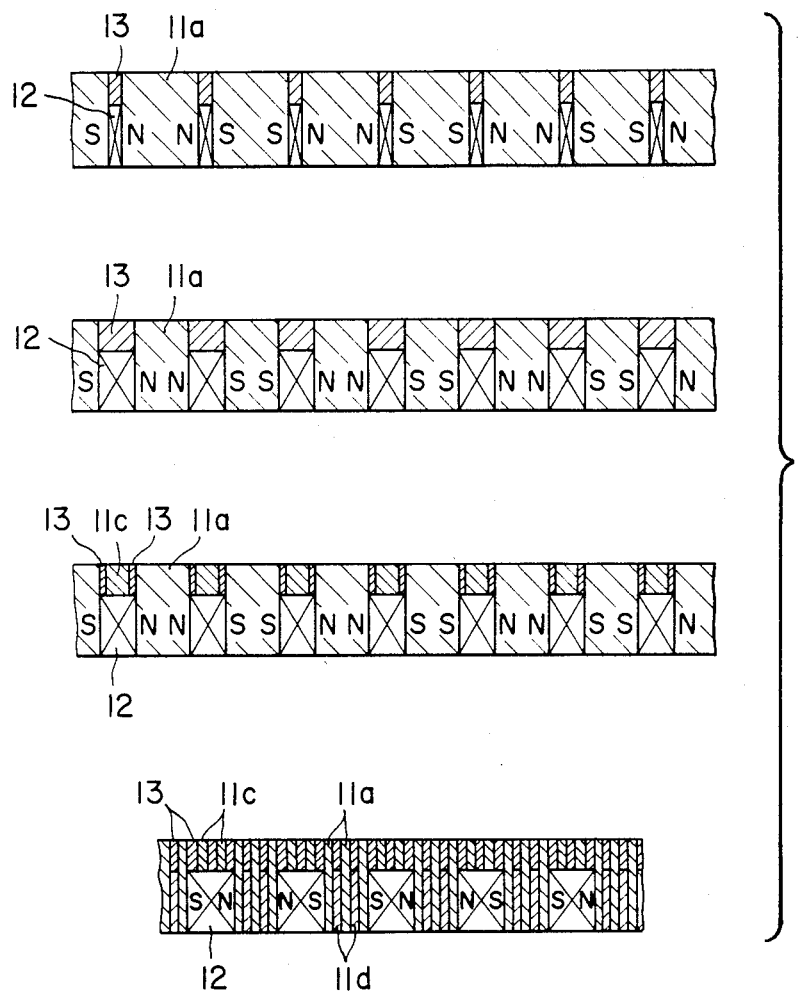
FIG. 7 is a view showing an example of the workpiece holding plates in accordance with the present invention.
Figure 8A:
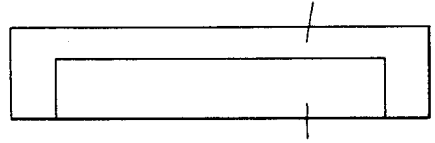
FIGS. 8A-8D are views used to explain respective elements of the workpiece holding plates as shown in FIG. 7.
Figure 8B:
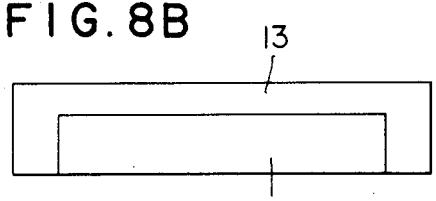
Figure 8C:
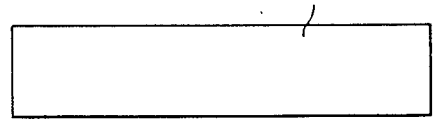
Figure 8D:
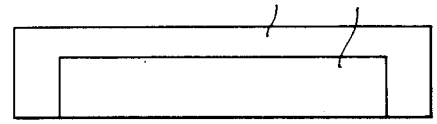

FIG. 7 shows an example of the workpiece holding plate in accordance with the present invention.

In FIG. 7 each isolator 13 is provided with one or more magnetic layers 11c which are made of ferrite or rare earth magnetic materials. Each isolator 13 as shown in FIG. 7 has two spaced apart magnetic layers 11c. When each isolator 12 consists of a magnetic material and an non-magnetic material, even a thin workpiece can be firmly held in position by the permanent magnetic chuck. That is, the magnetic lines of flux emerging from the magnetic pole piece 11c enter a workpiece and then the magnetic layer 11c and return to the workpiece and then the magnetic material layer 11c. Therefore a relatively large number of magnetic lines of flux can flow through a thin workpiece with a relatively high magnetic resistance so that the workpiece can be firmly held in position. It follows therefore that when each isolator 13 includes a large number of magnetic material layers 11c, a thin workpiece can be firmly held in position.

FIGS. 8A-8D are side views of the magnetic material layer 11c, the isolator 13 and the magnetic pole piece 11a-11d. The magnetic material layer 11c and the isolator 13 are preferably fitted into a recess in the permanent magnet 12 and it is also preferable that the magnetic pole piece 11a is separately formed and corresponds to the recess (indicated by the broken lines) of the permanent magnet 12. The reason is that the magnetic lines of flux can easily flow through the magnetic pole piece 11a.

Figure 9A:
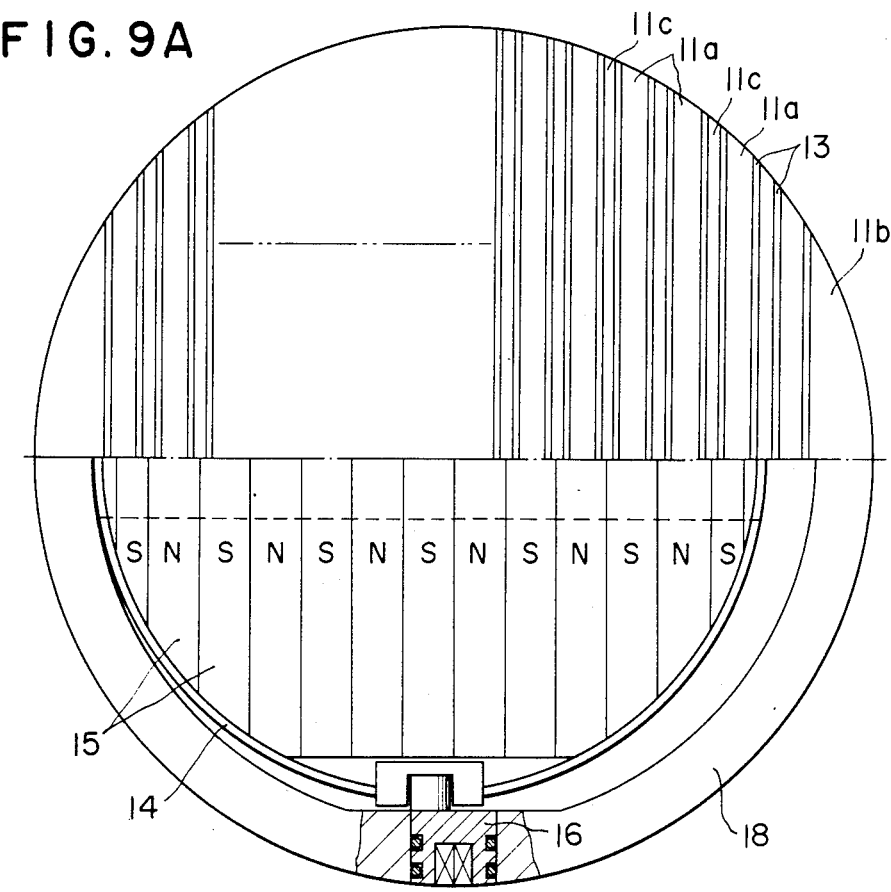
FIG. 9A is a top view, partly in section, of another embodiment of the present invention.
Figure 9B:
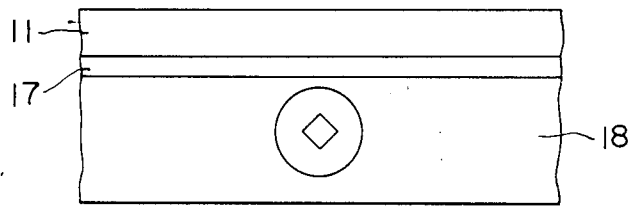
FIG. 9B is a side view thereof.
Figure 10:
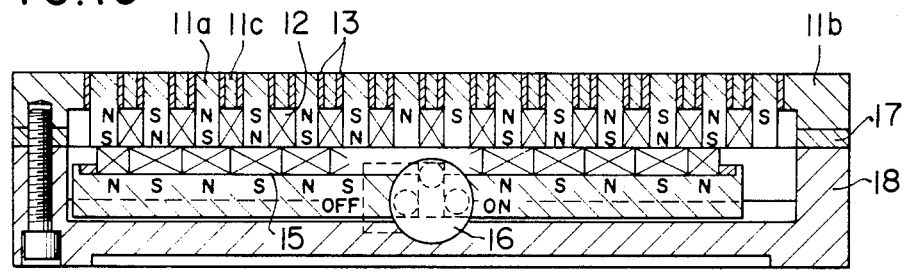
FIG. 10 is a longitudinal sectional view thereof.

FIGS. 9A and 9B and FIG. 10 show a further embodiment of a permanent magnetic chuck in accordance with the present invention. In this embodiment, the workpiece holding plate is round. FIG. 9A is a top view, partly in section; FIG. 9B is a side view; and FIG. 10 is a longitudinal sectional view. Since the workpiece holding plate is round, a sliding magnet member 15 is also round. The sliding magnet member 15 is so arranged that it may move vertically by a cam 16 mounted on a bottom plate 18. The main body frame 17 indicated by the broken lines serves to guide the sliding magnet member 15.

In the above-described embodiments, the magnetic lines of flux from the permanent magnets 15 flow through the bottom plate 18 made of a magnetic material, but it is to be understood that a yoke may be interposed between the sliding magnet member and the bottom plate 18. In the latter case, the workpiece holding plate is increased in thickness by the thickness of the yoke, but the bottom plate 18 can be made of a nonmagnetic material.

As described above, according to the present invention, the permanent magnets are made of a ferrite or rare earth magnetic material having a high coercive force and the direction of the magnetic lines of flux of the sliding permanent magnets is at right angles to the bottom surface of the workpiece holding plate (that is, in the vertical direction). As a consequence, there is provided a permanent magnetic chuck which has a better residual magnetism characteristic and whose workpiece holding plate is thin. The yoke of the sliding member can be eliminated and only the isolators and the permanent magnets with a relatively small permeability are made into contact with the magnetic pole pieces of the workpiece holding plate so that the magnetostriction phenomenon which results when the permanent magnet chuck is switched between the ON and OFF states can be eliminated and consequently the load required can be remarkably reduced.

What is claimed is:

1. A permanent magnetic chuck comprising:
   a workpiece holding plate having an attractive surface and a bottom surface, said holding plate having first permanent magnets with a high coercive force disposed along said bottom surface in a first direction each of said permanent magnents having a magnetic isolator adjacent to said permanent magnet disposed along said attractive surface said holding plate also having magnetic pole pieces which alternate with said permanent magnets, the poles of adjacent first permanent magnets which face each other being in an imposed magnetic relationship with each other, said isolator and magnetic pole pieces are respectively constructed as layers of a plurality of thin magnetic layers and a plurality of thin nonmagnetic layers each of which is disposed alternatively with each of said magnet layers;
   a sliding magnet member in which disk-shaped second permanent magnets with a high coercive force are disposed, in round holes provided in said member at the same pitch as the pitch of said first permanent magnets in said workpiece holding plate, said second permanent magnets being so disposed that the magnetic lines of flux are at right angles relative to said workpiece holding plate and that the magnetic poles of adjacent second permanet magnets are oppositely directed, said sliding magnet member being slidably made into contact with the bottom surface of said workpiece holding plate;
   a sliding mechanism for causing said sliding magnet member to slide by one pitch of said second permanent magnet in said first direction; and
   a bottom plate disposed in contact with the bottom surface of said sliding magnet member, said bottom plate and said first and second permanent magnets of said workpiece holding plate and sliding magnet member establishing magnetic circuits.

2. A permanent magnetic chuck as set forth in claim 1, wherein said first and second permanent magnets comprise ferrite magnets.

3. A permanent magnetic chuck as set forth in claim 1, wherein said first and second permanent magnets comprise rare earth magnets.

4. A permanent magnetic chuck comprising:
   a workpiece holding plate having an attractive surface and a bottom surface, said holding plate having first permanent magnets with a high coercive force disposed along said bottom surface in a first direction each of said permanent magnets having a magnetic isolator adjacent to said permanent magnets disposed along said attractive surface said holding plate also having magnetic pole pieces which alternate with said permanent magnets, the poles of adjacent first permanent magnets which face each other being in an opposed magnetic relationship with each other, said isolator and magnetic pole pieces are respectively constructed as layers of a plurality of thin magnetic layers and a plurality of thin nonmagnetic layers which are disposed alternatively with said magnetic layers;
   a sliding magnet member having at least a second permanent magnet which is rectangular-shaped and divided into sections which are polarized by divisional magnetization method so that the magnetic lines of flux are right angles relative to said workpiece holding plate and that the magnetic poles of adjacent second permanent magnets are oppositely directed, said sliding magnet member being slidably made into contact with the bottom surface of said workpiece holding plates;
   a sliding mechanism for causing said sliding magnet member to slide by one pitch of said second permanent magnet in said first direction; and
   a bottom plate disposed in contact with the bottom surface of said sliding magnet member, said bottom plate and said first and second permanent magnets of said workpiece holding plate and sliding magnet member establishing magnetic circuits.

5. A permanent magnetic chuck as set forth in claim 4, wherein said first and second permanent magnets comprises ferrite magnets.

6. A permanent magnet chuck as set forth in claim 4, wherein said first and second permanent magnets comprise rare earth magnets.

7. A permanent magnet chuck as set forth in claim 4, wherein said sliding magnet member is round in plan shape.

* * * * *